(12) United States Patent
McCormack et al.

(10) Patent No.: US 8,180,044 B1
(45) Date of Patent: May 15, 2012

(54) SEMANTIC CONTACT CENTER MANAGEMENT

(75) Inventors: Tony McCormack, Galway (IE); Paul D'Arcy, Galway (IE); Michael Hartman, Galway (IE); Neil O'Connor, Galway (IE)

(73) Assignee: Avaya Inc., Basking Ridge, NJ (US)

( * ) Notice: Subject to any disclaimer, the term of this patent is extended or adjusted under 35 U.S.C. 154(b) by 1585 days.

(21) Appl. No.: 11/286,659

(22) Filed: Feb. 16, 2006

(51) Int. Cl.
*H04M 5/00* (2006.01)

(52) U.S. Cl. ......... 379/265.12; 379/265.05; 379/265.06; 379/265.07; 379/265.08; 379/265.11

(58) Field of Classification Search ............ 379/265.01–265.02, 265.11–265.13
See application file for complete search history.

(56) References Cited

U.S. PATENT DOCUMENTS

| | | | | |
|---|---|---|---|---|
| 5,768,360 A * | 6/1998 | Reynolds et al. | ........ | 379/211.02 |
| 5,784,452 A * | 7/1998 | Carney | ........ | 379/265.06 |
| 6,222,918 B1 * | 4/2001 | De Kouchkovsky et al. | ........ | 379/265.13 |
| 6,333,980 B1 * | 12/2001 | Hollatz et al. | ........ | 379/265.12 |
| 6,347,139 B1 * | 2/2002 | Fisher et al. | ........ | 379/265.12 |
| 6,674,852 B1 * | 1/2004 | Hamilton | ........ | 379/221.14 |
| 6,711,253 B1 * | 3/2004 | Prabhaker | ........ | 379/265.01 |
| 6,771,765 B1 * | 8/2004 | Crowther et al. | ........ | 379/265.09 |
| 6,985,576 B1 * | 1/2006 | Huck | ........ | 379/265.09 |
| 7,133,520 B1 * | 11/2006 | Doyle et al. | ........ | 379/265.01 |
| 2004/0062380 A1 * | 4/2004 | Delaney | ........ | 379/265.02 |
| 2005/0125487 A1 * | 6/2005 | O'Connor et al. | ........ | 709/201 |
| 2005/0195962 A1 * | 9/2005 | Brown | ........ | 379/265.02 |
| 2005/0240594 A1 * | 10/2005 | McCormack et al. | ........ | 707/10 |
| 2006/0188085 A1 * | 8/2006 | Ricketts | ........ | 379/265.06 |
| 2006/0271418 A1 * | 11/2006 | Hackbarth, et al. | ........ | 705/7 |
| 2007/0064912 A1 * | 3/2007 | Kagan et al. | ........ | 379/265.1 |

* cited by examiner

*Primary Examiner* — Joseph J Nguyen
(74) *Attorney, Agent, or Firm* — Barnes & Thornburg LLP

(57) ABSTRACT

A semantic contact center management method and system is provided in which the resources of a contact center (including agents and contacts) are represented as resources connected by properties such as skills and shared prior interactions. Contacts are allocated to agents based on the degree of connectedness and the availability of agents, and this provides visual tools to represent the state of the contact center and to enable automated and supervisor intervention.

11 Claims, 5 Drawing Sheets

SEMANTIC CONTACT CENTER MANAGEMENT

TECHNICAL FIELD

This invention related to methods of managing of contact centers and to contact center systems employing such methods.

BACKGROUND ART

The management of contact centers requires the co-ordination of various resources such as agents, customers, contacts, queues and applications, and the assignment of resources to one another. For example, an incoming contact may be assigned to an interactive voice response (IVR) application which determines the identity of the customer (who may be represented in a database) and also determines the skillset(s) required to deal with the contact. The contact is typically then assigned to a queue which is serviced by a number of agents whereby it can ultimately be assigned to a suitable agent who is then placed in contact with the customer.

Typically, proprietary mechanisms have been used to manage the contact center resources. Typically, custom-written scripts are used to control the operation of the queues and the assignment of contacts to queues. These methods are not consistent across multiple vendors and nor are they generally compatible with third party standards-based analysis tools.

A significant drawback to conventional contact center management solutions is the relative inflexibility of script-based systems to control the flow of contacts within the contact centers. In particular, such systems are designed by identifying required skillsets, and then writing scripts to manage queues based on the skillsets.

This approach is very inflexible in that if a decision is made that certain skills are outdated or new skills need to be added, or that a number of skills need to be merged, the scripts need to be changed.

Furthermore, the vision of expected traffic patterns which the original scriptwriters may have had may not be optimum. If the reality does not match expectations, scripts can of course be rewritten. However, if the imbalance between queues is not great, then a decision may be taken to live with the original design decisions, which results in ongoing inefficiencies within the contact centers because the design was not optimal.

It is clear, therefore, that static script-based contact center management techniques may not provide the optimum method of managing complex or evolving contact centers.

A further problem with conventional contact center management methods is supervisor interaction with the queuing system can be difficult or clumsy. Supervisors are usually given a one-dimensional view of the contact center and load balancing is carried out by supervisors allocating agents to different queues. It is normally not possible for the supervisor to move contacts around from one queue to another. Relying on supervisors to balance the load across the contact center (by re-allocating agents to queues) results in the efficiency of the contact center being dependent almost entirely on the skill and experience of the supervisors.

The invention provides a method of managing a contact center having a number of agents. The method involves the steps of (a) maintaining a "virtual representation" of the agents of the contact center, in which agents are represented as resources connected to one another based on shared properties; (b) representing a contact as a resource having properties which enable it to be connected to one or more agents, so that the contact can be included in the virtual representation; and (c) assigning the contact to an agent based on the degree of connectedness between the contact and the agents connected directly or indirectly to the contact, and which are also based on the availability of the agents to service the contact.

This method differs fundamentally from the operation of conventional contact centers. Rather than having agents waiting for contacts at the top of a queue (or contacts at the top of a queue waiting for an agent to become free), contacts are entered into a virtual representation of the contact center in which they are connected to one or more agents based on known properties of the agent and of the contact. For example, a typical property allowing connections to be made between a contact and a set of agents would be the skill or skills required to service the contact. Language can similarly provide a connection from a contact to certain agents having the language abilities to deal with the contact. Another property generating a possible connection with one or more agents might be specifying which agents had dealt with that particular customer and/or that customer's organisation in the past. Where a number of connections are made between a contact and an agent, then the connection is strengthened. The various properties can be weighted relative to one another, and there can be absolute requirements, e.g. a shared language might be mandatory.

This method therefore allows the assignment of contacts to agents based on the degree of connectedness between the contacts and the agents of the contact center. The assignment of contacts is also based on the availability of agents and so if the most strongly connected agent is unavailable, a mechanism is in place for determining which agent might be next best suited to deal with the contact.

Preferably, the agents are represented in the virtual representation as resources whose shared properties include shared skills, and the contact properties can include skills required to service the contact properly, thereby enabling the contact to be entered in the virtual representation by creating connections with agents having skills matching those specified for the contact.

It will be appreciated that in the majority of contact center implementations, using skills to match agents with contacts remains one of the most important criteria for assigning contacts to agents. However, unlike current systems a queue is not needed. For example, in a conventional contact center if a contact is determined to require the skillset "English language video game sales" it is then placed in a queue dedicated to this skillset. In contrast, the present method allows the contact to have connections to agents who specialise in sales, and agents who have knowledge of video games, thereby potentially allowing a larger group of agents to service the contact but still preferentially ensuring that the best suited available agent is used. In a well designed system, such a contact may be most strongly connected with all agents having the specialisation of video game sales, but a relatively good connection might nevertheless be made with agents who have the specialisation of video game console sales, since such agents might be determined to share a good deal in common with the preferred agents (using the "friend of a friend" model which the Resource Description Framework allows).

Accordingly, in preferred embodiments, the degree of connectedness between the contact and agents is determined as a function of the number of connections between the contact and the agents.

Further preferably, the degree of connectedness between the contact and agents is determined as a function of the strength of connections between the contact and the agents where each connection has an assigned weight.

Preferably, the method also involves the step of presenting a visual representation of the virtual representation to enable human visualisation and/or interaction with the virtual representation of the contact center entities.

As will be further explained below, instead of a conventional statistical interface with contact centers (current wait time, number of agents idle, etc.) and the conventional queue-based representation available to supervisors, the current system can provide a visual representation of the virtual representation of relationships between the various contact center entities, and thus provides an overview at a glance of the connections between agents and contacts. Clustering can be easily identified in this way (possibly indicating an overload in one area of the contact center) and optionally, the supervisor can interact with the visual representation to influence the properties of resources, thereby influencing the connectedness between parties and reducing clustering.

Preferably, the method further includes the step of analysing the virtual representation to identify conditions where the number of connections to a given resource exceed a threshold.

Accordingly, much of the contact center management can be automated by analysing the number of connections to a given resource and determining when a resource is overburdened.

Further preferably, the method includes the step of automatically modifying one or more resources connected to the given resource to thereby influence the connections to the given resource.

In preferred embodiments, the connections between agent resources and contact resource are dynamically and automatically updated based on the current properties of the resources.

In this way, rather than simply being able to shift agents between queues, a supervisor can modify the properties of agents, or of contacts, or the strength or weighting to be assigned to certain types of connections, and in this way the model can be dynamically updated, to influence the allocation of contacts within the contact center.

Preferably, the agent and contact resources and properties conform to the Resource Description Framework. (The Resource Description Framework is a standard of the World Wide Web Consortium or W3C).

The agent resource properties may typically be selected from one or more of (but not limited to): skills, languages, location, prior transfers to or from other agents, and prior contacts with customers.

The contact resource properties may typically be selected from one or more of (but not limited to): skills, languages, location, prior contacts with agents, and customer identity.

The invention further provides a contact center management system comprising:
 an agent memory area storing a set of resources representing the agents of the contact center and properties thereof;
 a contact memory area storing a resource representing a contact having properties enabling connections to be made to agent resources;
 a processor operable to dynamically maintain a virtual representation of the agent resources in which the agents resources are connected to one another based on shared properties;
 the processor further being operable to add the contact resource to the virtual representation and connect the contact resource to one or more agents based on the properties of the contact resource and the agent resources; and
 the processor assigning the contact to an agent based on the degree of connectedness between the contact and agents connected directly or indirectly to the contact and on the availability of the agents to service the contact.

In another aspect, the invention provides a computer program product comprising machine readable instructions which when executed in a contact center management system are effective to cause the system to:
 maintain a virtual representation of agents of the contact center in which agents are represented as resources connected to one another based on shared properties;
 represent a contact as a resource having properties which enable it to be connected to one or more agents, whereby the contact can be entered in the virtual representation; and
 assign the contact to an agent based on the degree of connectedness between the contact and agents connected directly or indirectly to the contact and on the availability of the agents to service the contact

BRIEF DESCRIPTION OF THE DRAWINGS

The invention will now be further illustrated with the following description of embodiments thereof, given by way of example only with reference to the accompanying Figures in which.

DETAILED DESCRIPTION OF PREFERRED EMBODIMENTS

Figure 1:
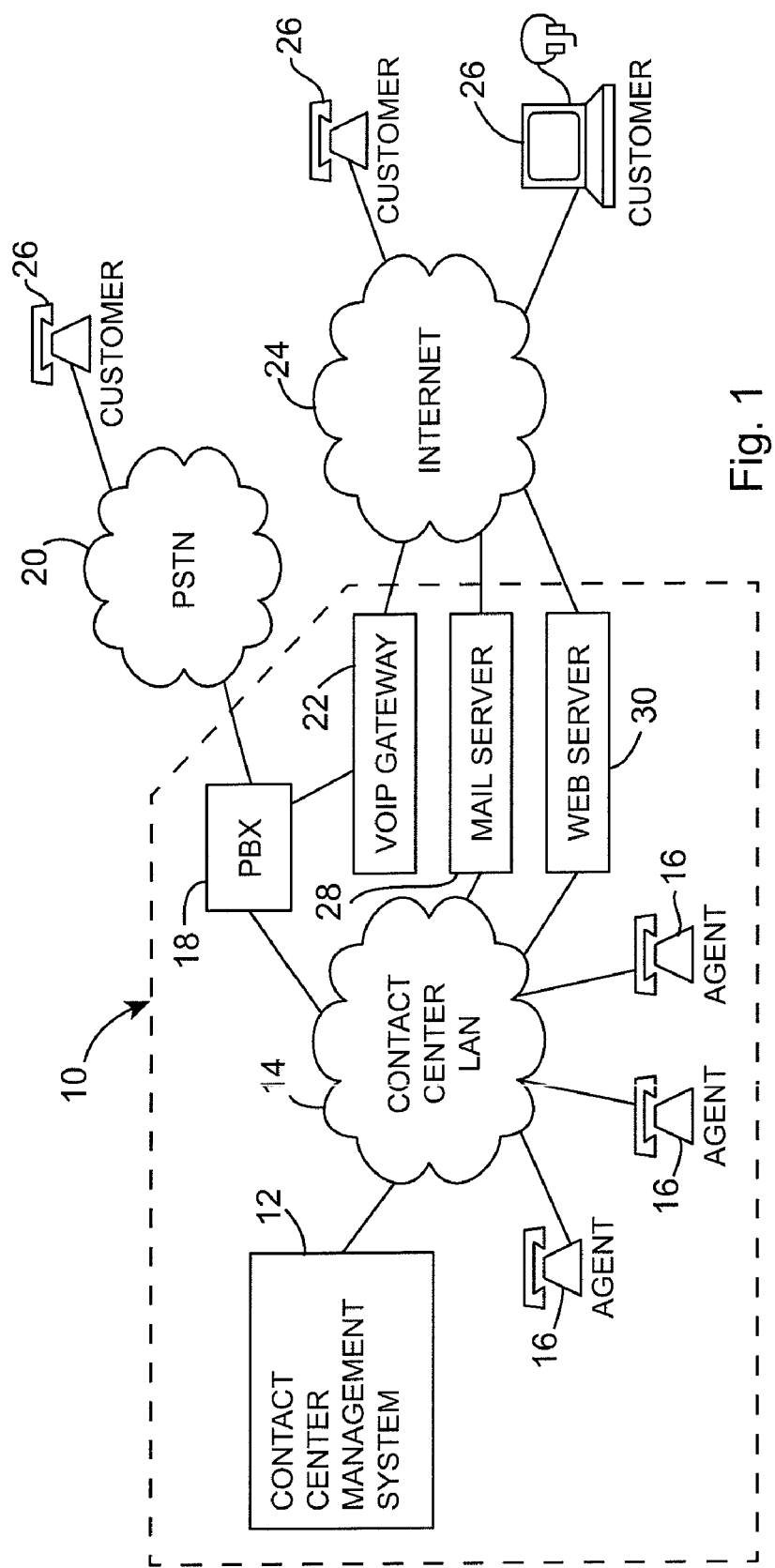
FIG. 1 is a schematic architecture of a contact center and associated infrastructure employed to connect thereto.

FIG. 1 shows the overall architecture of a contact center and the infrastructure used by customers to connect to the contact center.

The contact center is indicated generally at 10 and comprises a contact center management system 12 which will be described in further detail below. The management system 12 is connected via a contact center local area network (LAN) 14 (also referred to as an agent LAN) to a number of agent workstations 16. The agent workstations can be simple telephone extensions or increasingly commonly, they are multimedia terminals allowing the agents to handle not only voice calls but also chat sessions, emails and instant messaging sessions.

Telephone calls to and from the contact center 10 are controlled by a private branch exchange or PBX 18 which is connected to the public switched telephone network (PSTN) 20 and, via a Voice over Internet Protocol (VoIP) gateway 22, to the Internet 24. The PBX function could alternatively be provided by a software-only switch, such as one which is based on the Session Initiative Protocol (SIP). Accordingly, customers 26 can connect by telephone either via the PSTN 20 or the Internet 24 to the contact center 10. Customers can also connect using the medium of email via a mail server 28, or a web server 30 may provide an interface such as a dedicated chat system or a web form submission system for customers to connect with the contact center 10.

As the skilled person will appreciate, basic contact center architectures such as that shown in FIG. 1 are well known and many variations and modifications on this basic implementation can be readily effected and will nevertheless allow implementation of the present invention.

Figure 2:
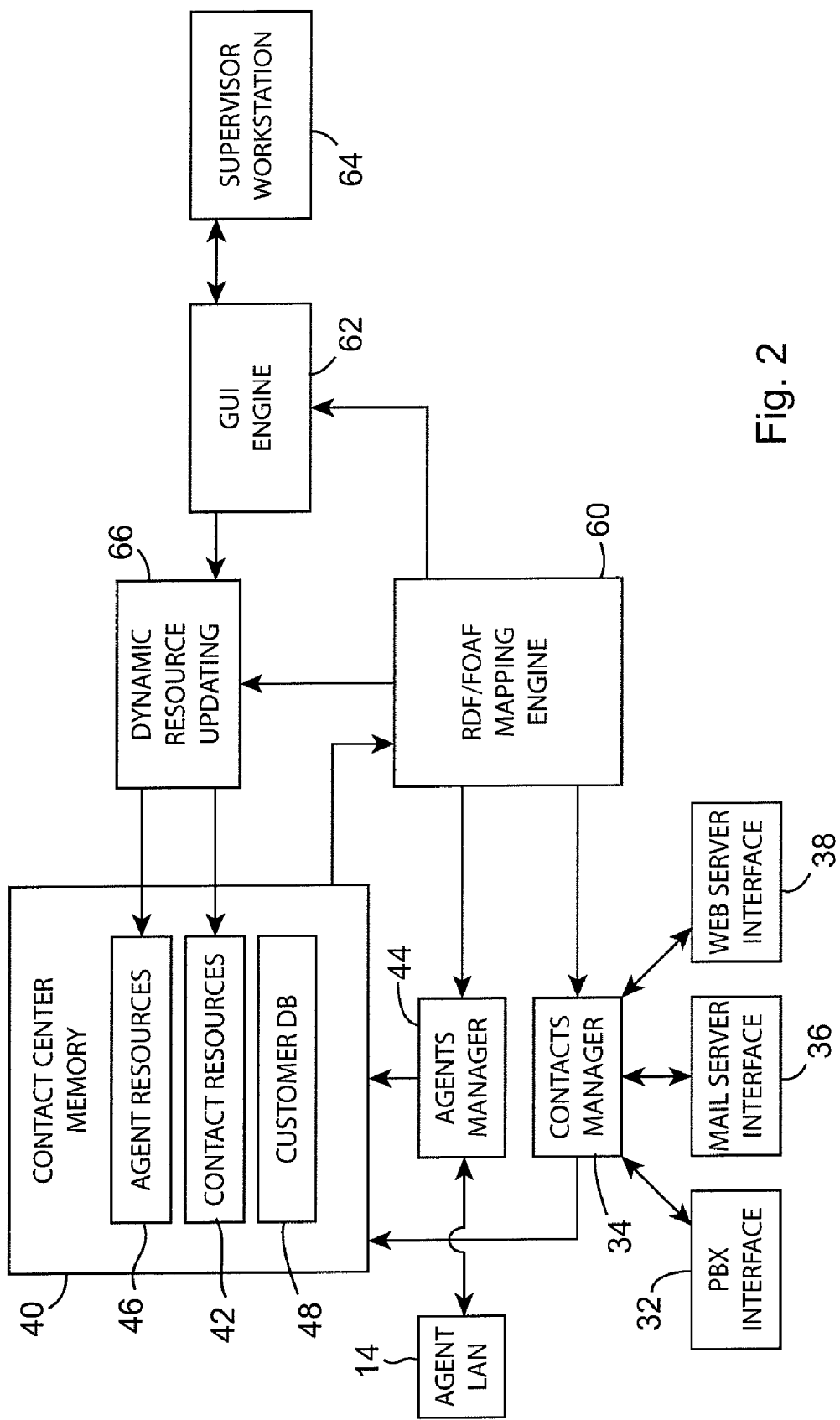
FIG. 2 is a block diagram of the major functional elements of a contact center management system.

FIG. 2 is a block diagram of the most important features of the contact center management system 12 insofar as it relates to the present invention.

When a call is received at PBX 18 from a customer 26 (FIG. 1) the PBX 18 notifies the contact center management system 12 via a PBX interface 32 (FIG. 2). A contacts manager 34 generates a new contact within the system upon such notification and instructs the PBX where to direct the call. In a typical scenario, all calls will be initially directed to an interactive voice response or IVR engine (not shown) in order to elucidate more information about the customer and the nature of the call, thereby allowing the call to be better directed. The use of such a system can also, in many cases, allow a call to be dealt with and terminated automatically without the need for human intervention. If a call is terminated, the PBX interface will again be notified and the contacts manager 34 can delete the contact if appropriate.

The contacts manager 34 can also receive notification of events giving rise to a new contact from a mail server interface 36 or a web server interface 38. Interfaces to other communication systems can similarly be added. When a new contact is generated by the contacts manager, details of the contact are stored in memory 40 within a contact resources area 42.

The contact center management system 12 similarly has an agents manager subsystem 44 which interfaces with the agent 16 via the local area network 14 (labelled in FIG. 2 as an Agent LAN). Thus, when agents come on-line or go off-line, or when they begin dealing with a contact or complete their dealings with a contact, events are notified to the agents manager allowing the agents manager 44 to update details of the particular agent in an agent resources area 46 of the contact center memory 40.

The contact center memory also has a customer database 48 which allows the contacts manager 34 to augment the information stored about any given contact based on the identity of the customer (as determined from the IVR system or from the customer's caller ID or IP address, for example). Some information which might be stored in the customer database includes preferences stored by the customer, details of prior interactions with the contact center, notes made by agents during prior interactions, identification of the agents who have previously dealt with the customer, etc.

Figure 3:
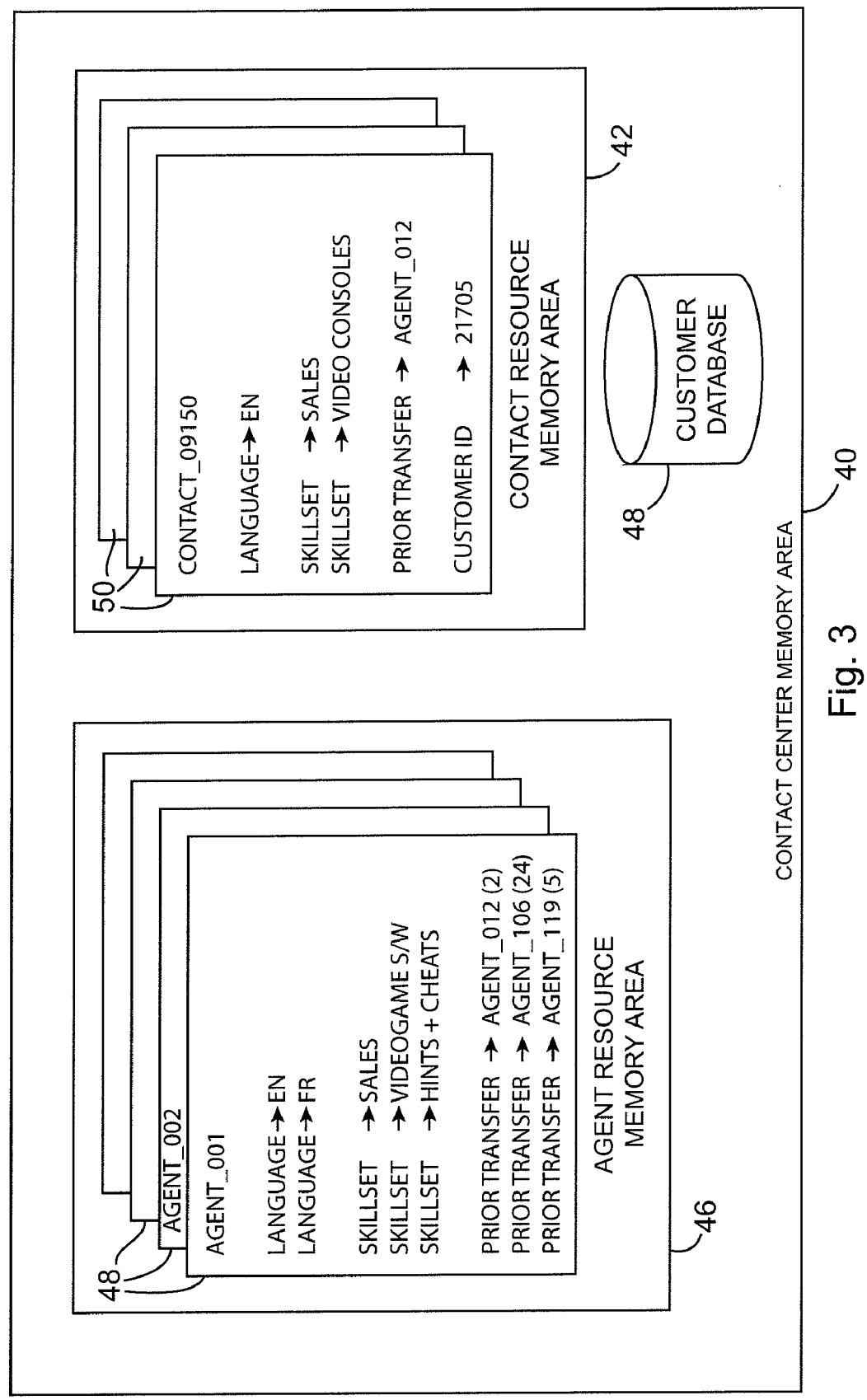
FIG. 3 is a representation of the records in a memory of the management system of FIG. 2.

Referring additionally to FIG. 3, some further detail will be described in relation to the information stored in the agent resource memory area 46 and the contact resource memory area 42.

An agent record 50 is created and stored in the agent resource memory area 46 for each active agent. This record includes information such as the languages in which the agent is competent, the skillsets with which the agent is competent to deal, and, in the illustrated embodiment, details of those other agents to or from whom prior transfers of contacts have been recorded. It can be seen, for example, in the case of the illustrated agent_001, that there is a strong record of transfers with agent_106 (24 instances). Agents with whom there is a history of sharing contacts may be regarded as being associated or connected in some way with agent_001 and this information is to be used to increase the probability that contacts will be transferred between these agents in the future.

In somewhat similar fashion, each active contact gives rise to a contact record 52 which can record, for example, the language of the contact, the skillsets required to deal with the contact, details of prior agent interaction with that customer, and an identification of the customer from the customer database.

Figure 4:
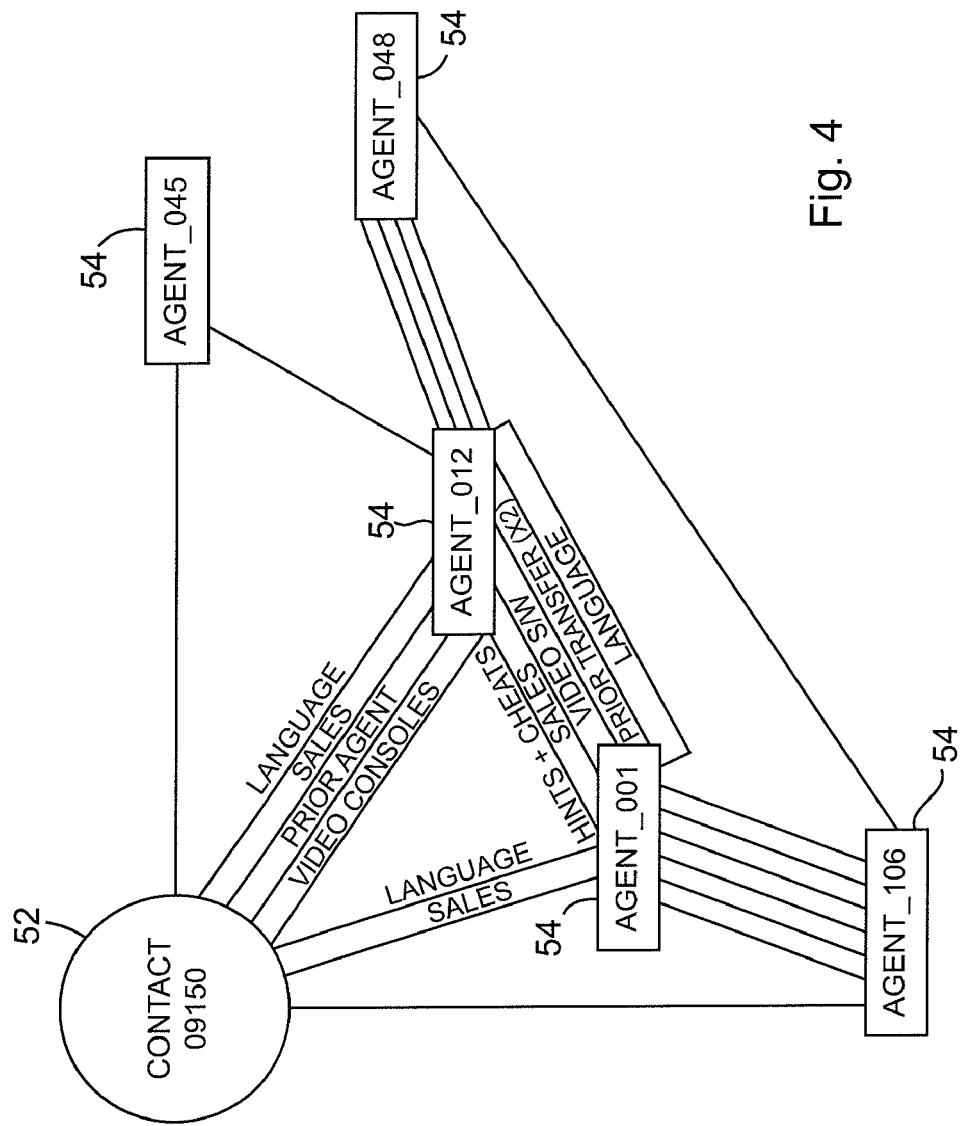
FIG. 4 is a visual representation of a virtual representation of the relationship between a contact and a group of agents.

Referring now to FIG. 4, a visualisation is shown of a virtual representation created from a contact and a small number of agents. Contact 09150 (whose record is shown in FIG. 3) is indicated as a resource of the contact center at 52. A number of agent resources 54 are also mapped, i.e. agent_001, agent_0012, agent_045, agent_048 and agent_106. It should be appreciated that FIG. 4 is an extremely simplified representation of the relationships between a handful of agents and a single contact.

Focussing first on the relationship between contact 09150 and agent_001, it can be seen that agent_001 has the required language and the skillset of "sales" enabling that agent to deal with the contact. At first glance it would appear that the agent is, however, lacking the skillset of "video consoles" which might enable the agent to effectively deal with the contact.

A far more suitable agent appears to be agent_012 which shares not only the language and the "sales" skillset, but also shares the "video consoles" skillset and is indicated as a prior agent, i.e. the agent in question has dealt with the customer in question before. It appears, therefore, that agent_012 is ideally placed to deal with contact 09150.

The relationships indicated in FIG. 4 are generated automatically and updated dynamically based on descriptions of resources such as that specified in the resource description framework (RDF) specification of the World Wide Web consortium, as set out at http://www.w3.org/RDF.

RDF is a language for representing information about resources and about the relationships between resources. By describing resources in terms of simple properties and property values, simple statements can be made about resources and their relationships can be grasped.

While the purpose of RDF is to allow resources on the Internet to be described and understood in a standardised fashion, the implementation of the invention shown in FIG. 4 adapts RDF (or indeed some other system having similar features) to provide a description of the resources of a contact center and their interrelationships.

As concluded above, agent_012 appears to be a perfectly suitable agent to service contact 09150. However, if agent_012 is currently busy, the question arises as to whether the contact can be directed to another suitable agent or whether it must be maintained on hold until agent_012 becomes free. Conventional contact center systems would maintain a contact within a queue until one of a pool of agents assigned to service that queue became free. The present invention handles contacts differently.

It can be seen from some of the (unlabeled) links that the contact in question is only weakly connected to agent_045 and agent_119 and has no direct connections to agent_048.

Nevertheless, if we examine the most suitable agent (agent_012) it can be seen that this agent shares very strong connections with agent_001 and appears to have a number of strong connections also with agent_048. This provides an objective indication that each of these agents is likely to share many of the competencies required to deal with the contact.

For example, while agent_001 does not have the skillset of "video consoles" he or she does share with agent_012 the "video game software" skillset and the video game "hints and cheats" skillset. This indicates that the backgrounds of both agents share much in common and provides a likelihood that agent_001 can deal with many of the queries that might normally be dealt with by agent_012. The same is likely to be true of agent_048.

In the context of a busy contact center, there is frequently a requirement to relax queuing rules. In this case, if there is no agent currently free with the "video consoles" skillset, contact 09150 can be handed over to one of the agents most strongly connected with agent_012, namely agent_001 or agent_048.

Apart from shared skillsets, languages, competencies, and prior transfers, another important factor for determining the manner in which the contact might be transferred is the "geodesic distance" (the number of ties or steps it takes to travel from the contact node to the various agent nodes). From this perspective, agent_048 is the least suitable of the five agents indicated. Contact 09150 is connected directly to all of the agents except agent_048, which is one step removed. Factoring geodesic distance in is likely to make agent_001 a more preferable alternative than agent_048, but this depends also on the weight attached to geodesic distance.

Another factor which might be taken into account is the weighting assigned to different types of ties. If, for example, a contact center deals with a wide range of computer based issues, but a contact information suggests that the contact requires an agent having the skillset of the programming language C++, the likelihood is that agents who do not have C++, or at the very least an object oriented programming language, in their skillsets, will be very poorly equipped to deal with the contact. In such cases, a very strong weighting might be given to ties indicating a common skillset of "C++", and a lower weighting might be given to other object oriented languages. One can also introduce the concept of a negative connection. Thus, an agent who has no object oriented language in their skillset might be seen to have a negative connection to this hypothetical contact: the system would recognise that it is simply inappropriate to pass the contact to such an agent, irrespective of any other connections pointing towards suitability.

This concept of negative connections can also be illustrated with reference to FIG. 4. It can be seen that contact 09150 has the "language" connection with agent_012 and agent_001. Let us assume that agent_048 is only competent in the German language and therefore does not have the required language of English to service contact 09150. The rules might, in such a case, recognise that agent_048 could not service contact 09150 under any circumstances and therefore that agent could be overlooked or bypassed when seeking suitable alternatives to agent_012.

The contact assignment to an agent can also rely on the concept of thresholds. Assume that agent_045 is connected to contact 09150 only by language and not by any skillset or any prior interaction. A determination might be made that there was insufficient connection (despite the close geodesic distance) to allow the agent to service the contact. In other words, if the only attribute of suitability of agent_045 is the ability to speak English, then a decision might be taken that agent_045 will not be given the contact to service. In other circumstances, however, it might be decided that agent_045 should be allowed to service the contact solely to the extent that the agent is authorised to take the contact's details and arrange a call-back. Clearly such choices are within the competence of the system designer.

The system designer can similarly decide which factors are most important when evaluating connections (e.g. prior agent interaction, language, skillset, transfers between agents, etc.) and typically the strength of connection between various contacts can be given an overall weighting or score. This allows the representation shown in FIG. 4 to be greatly simplified and in particular would allow a larger subset of the agents and contacts of a contact center to be visualised and manipulated.

Figure 5:
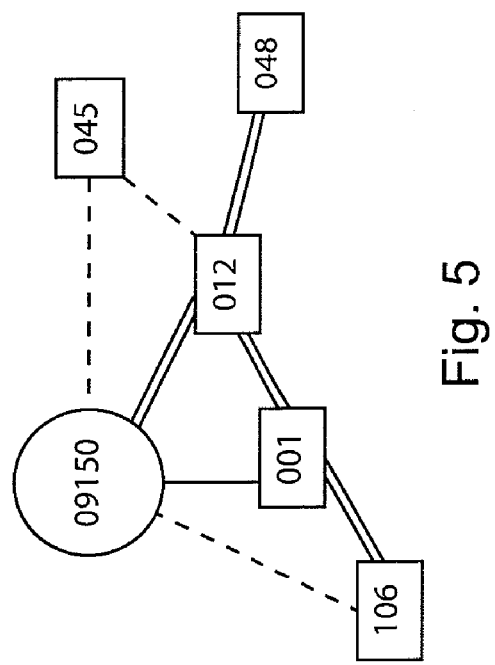
FIG. 5 is an alternative visual representation corresponding to FIG. 4.

Thus, for example, the same small set of agents and the contact can be visualised as shown in FIG. 5, which has three degrees of connectivity between any two nodes. A dotted line represents a very weak connection (one tie only) such as between contact 09150 and agent_045. A single line represents a moderate strength connection, such as between contact 09150 and agent_001. A double line represents a strong number of connections, such as between contact 09150 and agent_012.

It will be appreciated that representing the relationships between resources in this way allows a greater number of resources to be viewed and allows more of the contact center activity to be evaluated at a single glance.

Apart altogether from the strength of connection, the use of different appearance connections (dotted lines, solid lines and double lines, or different colours, for example) could be used to indicate different types of connections. Thus, one connection might be used to indicate shared language, another colour might indicate shared skillsets, and another colour might indicate prior interactions.

A further option available to the system designer is to allow a supervisor to visualise only the relationships between agents or to click on a single contact or a single agent and highlight all relevant connections to or from that resource. As an example, we described above that contact 09150 and agent_048 might (according to the rules of system) be determined never to be compatible due to no shared language. In such a case, clicking on contact 09150 might remove agent 048 from the representation along with any other agents who were determined to be unsuitable due to the criteria specified by the system designer (no shared language, no shared skillset, excessive geodesic distance, et.).

Figure 6:
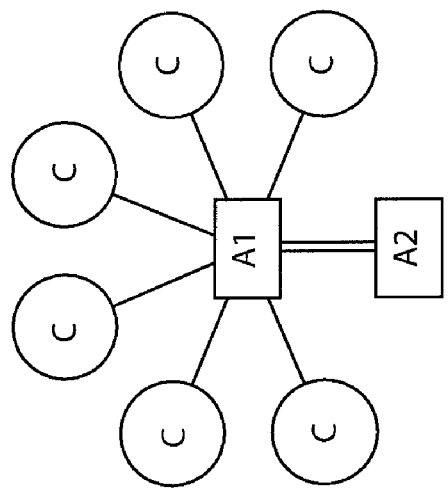
FIG. 6 is a visual representation of a virtual representation of the relationship between a group of contacts and a group of agents.

FIG. 6 indicates a different scenario in which a relative large number of contacts denoted by circles with the letter "C", are connected to a first agent A1 while a second agent A2 sits idle and has no contact directly connected to it. If the tie between agents A1 and A2 is an indication (for example) that a primary skillset of agent A1 is a secondary skillset of agent A2, then an automated system might temporarily "upgrade" that skillset for agent A2.

Such an automated system would preferably run continuously or periodically at a high frequency, examining the connectedness of resources (i.e. the number of ties to a given agent). Where thresholds are exceeded, such as for agent A1 in FIG. 6, the automated system might modify the configuration of agent node A2 in such a way that connections are created between the contacts and the modified agents. Similarly, a human supervisor might see at a glance that a certain area of the virtual representation of the contact center is overly crowded or clustered and might take steps to modify agent resources, contact resources or rules in order to better spread the workload.

One can also envisage a hybrid system in which the automated monitoring function identifies problem areas and possible solutions and allows the supervisor to decide what solution to choose. As an example, the supervisor's workstation might be prompted with the following message:

"Insufficient number of agents with the skillset billing complaints. Suggest using agents with the skillset customer service or the skillset accounts."

The supervisor could then click on whichever of the suggested skillsets was thought to be more appropriate to deal with excessive workload in billing complaints, or could override the system suggestions and choose a different skillset entirely—or simply observe matters and hope that the problem resolves itself.

Referring back to FIG. 2, the agent resources and contact resources (which it will be recalled were maintained by the agents manager 44 and contacts manager 34, respectively), are continuously monitored by an RDF/FOAF mapping engine (FOAF refers to "Friend of a friend" which is an implementation of RDF describing connectedness between resources).

The mapping engine 60 maintains a dynamically updated virtual representation of all of the resources of the contact center. It is this virtual representation which has been described above in relation to the small sections which are visually represented in FIGS. 4, 5 and 6. In effect, the mapping engine is what determines the degree of connectedness between resources and thus allows assignment of contacts to agents based on their degree of connectedness.

A set of rules is built into the mapping engine 60 or is programmable into the mapping engine to evaluate strength of connections, and the contacts manager 34 employs these evaluations to assign contacts to agents. When a contact is assigned to an agent, the appropriate interface (PBX interface 32, mail server interface 36 or web server interface 38) is instructed to route the contact appropriately to the correct agent, and the contact resource 42 and agent resource 46 are updated with details of the contact routing.

The RDF/FOAF mapping engine 60 communicates with a graphic user interface (GUI) engine 62 which is responsible for translating the virtual representation maintained by the mapping engine into visual terms for display at a supervisor workstation 64. In this way, the supervisor can interact with the representation by focusing on certain types of resources, by "zooming in" on areas requiring attention, or by interacting with system messages as described above.

The GUI engine responds to supervisor interaction by instructing a dynamic resource updating module 66 to make appropriate changes in the agent resources or contact resources to implement the commands of the supervisor.

As an example, the supervisor might, as mentioned above, temporarily upgrade a secondary skillset of a particular agent or group of agents to be viewed as a primary skillset. This occurs by the dynamic resource updating module 66 updating the relevant agent resource records in agent resource area 46.

In similar fashion, the RDF/FOAF mapping engine can act in automated mode to identify areas requiring attention and to take appropriate action by instructing the dynamic resource updating module 66.

While the description provided above has concentrated on the maintenance, visualisation and manipulation of agent resources and contact resources, it is to be understood that any other resources of the contact center can similarly be mapped in a semantic fashion according to the invention. Other resources could include applications available to the contact center, customers (as opposed to contacts), and queues. While the contact center does not operate a queuing system in the normal sense, skillsets of contacts and of agents can be represented as queues in order to identify how workload is balanced across the contact center.

The embodiments described herein may be modified or varied without departing from the spirit and scope of the claimed invention.

We claim:

1. A method of managing a contact center having a plurality of agents, the method comprising the steps of:
   maintaining a virtual representation of the agents of the contact center in which agents are represented as resources connected to one another based on shared properties;
   representing a contact as a resource having properties which enable it to be connected to one or more agents, whereby said contact can be entered in said virtual representation;
   wherein said contact is represented within said representation as being connected directly to at least a first agent based on a first set of shared properties between said contact and first said agent, and said contact is represented within said representation as being connected indirectly to at least a second agent based on a second set of shared properties between said first and second agents, said second set of shared properties including properties not forming part of said first set of properties;
   assigning said contact to an agent based on the degree of connectedness between the contact and agents connected directly or indirectly to the contact calculated as a function of at least one of the number and strength of said first and second sets of shared properties and on the availability of said agents to service the contact;
   analyzing the virtual representation to identify conditions where the number of connections to a given resource exceed a threshold, and
   automatically modifying one or more resources connected to said given resource to thereby influence the connections to said given resource.

2. A method of managing a contact center as claimed in claim 1, wherein said agents are represented in said virtual representation as resources whose shared properties include shared skills and wherein said properties of said contact also include skills, thereby enabling the contact to be entered in said virtual representation by creating connections with agents having skills matching those specified for the contact.

3. A method of managing a contact center as claimed in claim 1, wherein the degree of connectedness between the contact and agents is determined as a function of the number of connections between the contact and said agents.

4. A method of managing a contact center as claimed in claim 1, wherein the degree of connectedness between the contact and agents is determined as a function of the strength of connections between the contact and said agents where each connection has an assigned weight.

5. A method of managing a contact center as claimed in claim 1, further comprising the step of presenting a visual representation of said virtual representation to enable at least one of human visualisation and interaction with the virtual representation.

6. A method of managing a contact center as claimed in claim 1, wherein said connections between agent resources and said contact resource are dynamically and automatically updated based on the current properties of said resources.

7. A method of managing a contact center as claimed in claim 1, wherein said agent and contact resources and properties conform to the Resource Description Framework.

8. A method of managing a contact center as claimed in claim 1, wherein said agent resource properties are selected from one or more of: skills, languages, location, prior transfers to or from other agents, and prior contacts with customers.

9. A method of managing a contact center as claimed in claim 1, wherein said contact resource properties are selected from one or more of: skills, languages, location, prior contacts with agents, and customer identity.

10. A contact center management system comprising:
an agent memory area storing a set of resources representing the agents of the contact center and properties thereof;
a contact memory area storing a resource representing a contact having properties enabling connections to be made to agent resources;
a processor operable to dynamically maintain a virtual representation of said agent resources in which said agents resources are connected to one another based on shared properties;
said processor further being operable to add said contact resource to said virtual representation and connect said contact resource to one or more agents based on the properties of the contact resource and the agent resources;
wherein said contact is represented within said representation as being connected directly to at least a first agent based on a first set of shared properties between said contact and first said agent, and said contact is represented within said representation as being connected indirectly to at least a second agent based on a second set of shared properties between said first and second agents, said second set of shared properties including properties not forming part of said first set of properties;
said processor assigning said contact to an agent based on the degree of connectedness between the contact and agents connected directly or indirectly to the contact calculated as a function of at least one of the number and strength of said first and second sets of shared properties and on the availability of said agents to service the contact; and
said processor analyzing the virtual representation to identify conditions where the number of connections to a given resource exceed a threshold, and
automatically modifying one or more resources connected to said given resource to thereby influence the connections to said given resource.

11. A non-transitory machine-readable medium comprising machine-readable instructions which when executed in a contact center management system are effective to cause said system to:
maintain a virtual representation of agents of the contact center in which agents are represented as resources connected to one another based on shared properties;
represent a contact as a resource having properties which enable it to be connected to one or more agents, whereby said contact can be entered in said virtual representation;
wherein said contact is represented within said representation as being connected directly to at least a first agent based on a first set of shared properties between said contact and first said agent, and said contact is represented within said representation as being connected indirectly to at least a second agent based on a second set of shared properties between said first and second agents, said second set of shared properties including properties not forming part of said first set of properties;
assign said contact to an agent based on the degree of connectedness between the contact and agents connected directly or indirectly to the contact calculated as a function of at least one of the number and strength of said first and second sets of shared properties and on the availability of said agents to service the contact;
analyzing the virtual representation to identify conditions where the number of connections to a given resource exceed a threshold, and
automatically modifying one or more resources connected to said given resource to thereby influence the connections to said given resource.

* * * * *